United States Patent
Fukushi et al.

(10) Patent No.: US 11,597,816 B2
(45) Date of Patent: Mar. 7, 2023

(54) PEROXIDE-CURED HALOGENATED ELASTOMERS HAVING A SILICON-CONTAINING SUPERFICIAL LAYER

(71) Applicant: 3M INNOVATIVE PROPERTIES COMPANY, St. Paul, MN (US)

(72) Inventors: Tatsuo Fukushi, Woodbury, MN (US); Tho Q. Nguyen, Bloomington, MN (US); Allen M. Sohlo, Lindstrom, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 145 days.

(21) Appl. No.: 16/955,170

(22) PCT Filed: Dec. 19, 2018

(86) PCT No.: PCT/US2018/066454
§ 371 (c)(1),
(2) Date: Jun. 18, 2020

(87) PCT Pub. No.: WO2019/126298
PCT Pub. Date: Jun. 27, 2019

(65) Prior Publication Data
US 2020/0317887 A1    Oct. 8, 2020

Related U.S. Application Data

(60) Provisional application No. 62/609,423, filed on Dec. 22, 2017.

(51) Int. Cl.
*C08K 5/14* (2006.01)
*C08K 5/5415* (2006.01)
*C08K 3/34* (2006.01)
*C08K 5/50* (2006.01)

(52) U.S. Cl.
CPC .............. *C08K 5/5415* (2013.01); *C08K 3/34* (2013.01); *C08K 5/14* (2013.01); *C08K 5/50* (2013.01)

(58) Field of Classification Search
CPC ... C08K 3/34; C08K 3/36; C08K 5/54; C08K 5/14; C08L 27/12; C08L 27/14; C08L 27/16; C08L 27/22; C08F 8/26
See application file for complete search history.

(56) References Cited

U.S. PATENT DOCUMENTS

| | | |
|---|---|---|
| 3,876,654 A | 4/1975 | Pattison |
| 4,233,421 A | 11/1980 | Worm |
| 4,678,842 A | 7/1987 | Sandler |
| 4,912,171 A | 3/1990 | Grootaert |
| 4,981,912 A | 1/1991 | Kurihara |
| 5,086,123 A | 2/1992 | Guenthner |
| 5,225,504 A | 7/1993 | Tatsu |
| 5,262,490 A | 11/1993 | Kolb |
| 5,591,804 A | 1/1997 | Coggio |
| 5,929,169 A | 7/1999 | Jing |
| 6,191,233 B1 | 2/2001 | Kishine |
| 7,070,842 B2* | 7/2006 | Corveleyn ............ B32B 27/304 428/447 |
| 7,253,236 B2 | 8/2007 | Paglia |
| 7,279,530 B2 | 10/2007 | Higashira |
| 7,977,433 B2 | 7/2011 | Sano |
| 8,013,064 B2 | 9/2011 | Nakazato |
| 2002/0013438 A1* | 1/2002 | Grootaert ................. C08K 5/14 526/242 |
| 2007/0205533 A1* | 9/2007 | Matsuda ................ C08J 7/0427 264/241 |
| 2009/0093590 A1 | 4/2009 | Okazaki |
| 2010/0311908 A1 | 12/2010 | Hirose |
| 2013/0020286 A1 | 1/2013 | Yeon |
| 2013/0102869 A1 | 4/2013 | Kordis |

FOREIGN PATENT DOCUMENTS

| | | |
|---|---|---|
| CN | 1756657 A | 4/2006 |
| EP | 0292747 | 11/1988 |
| EP | 0434046 | 6/1991 |
| EP | 2322575 | 5/2011 |
| JP | 2002-293950 | 10/2002 |
| JP | 2004-528452 A | 9/2004 |
| JP | 2007-169511 A | 7/2007 |
| JP | 2008-045001 A | 2/2008 |
| JP | 2012-531493 A | 12/2012 |
| WO | 2002/088248 A1 | 11/2002 |
| WO | WO 2004-011543 | 2/2004 |
| WO | 2004/078470 A1 | 9/2004 |
| WO | WO 2005-090470 | 9/2005 |
| WO | 2010/151610 A2 | 12/2010 |
| WO | WO 2012-018603 | 2/2012 |
| WO | WO 2015-122537 | 8/2015 |
| WO | WO 2016-100420 | 6/2016 |
| WO | WO 2016-100421 | 6/2016 |
| WO | 2017/011379 A1 | 1/2017 |

(Continued)

OTHER PUBLICATIONS

XP002779269, Database WPI Week 201558 Thomson Scientific, 2014, pp. 1-3.

(Continued)

*Primary Examiner* — Robert C Boyle
(74) *Attorney, Agent, or Firm* — Julie Lapos-Kuchar

(57) ABSTRACT

Described herein is curable composition comprising a partially halogenated elastomeric gum comprising a plurality of cure sites selected from at least one of iodine, bromine, and nitrile; a silicon-containing compound; a dehydrohalogenation agent; and a peroxide cure system. Upon curing, a silicon-containing superficial layer forms, which can provide good chemical stability, increased durability, non-tackiness, and a matte finish to the cured elastomer.

19 Claims, No Drawings

(56) References Cited

FOREIGN PATENT DOCUMENTS

| WO | WO 2017-013379 | 1/2017 |
| WO | WO 2018-125790 | 7/2018 |
| WO | WO 2018-136324 | 7/2018 |
| WO | WO 2018-136331 | 7/2018 |
| WO | WO 2018-136332 | 7/2018 |

OTHER PUBLICATIONS

XP002779270, Database WPI Week 200319 Thomson Scientific, 2017, pp. 1-4.
XP002779285, Database WPI Week 200573 Thomson Scientific, 2017, pp. 1-5.
International Search Report for PCT International Application No. PCT/US2018/066454, dated Mar. 25, 2019, 5 pages.

* cited by examiner

PEROXIDE-CURED HALOGENATED ELASTOMERS HAVING A SILICON-CONTAINING SUPERFICIAL LAYER

CROSS REFERENCE TO RELATED APPLICATIONS

This application is a national stage filing under 35 U.S.C. 371 of PCT/US2018/066454, filed Dec. 19, 2018, which claims the benefit of U.S. Application No. 62/609,423, filed Dec. 22, 2017, the disclosure of which is incorporated by reference in its/their entirety herein.

TECHNICAL FIELD

Halogenated elastomers having a superficial layer comprising silicon are described including precursor compositions and methods of making such elastomers.

SUMMARY

Fluoroelastomers are widely used as shaped or molded parts in sealing applications (e.g., O-rings, gaskets, and packings) and in contact applications (e.g., belts, stoppers for printer heads, and head controllers of hard disk drives). Thus, it is important that the fluoroelastomers have non-tacky surfaces.

Surface treatment to the fluoroelastomer has been done to reduce the surface stickiness while maintaining the elastomeric properties. In one such treatment, a molded and cured fluoroelastomer is immersed in a curating agent and post-cured. This treatment results in a higher level of crosslinking at the fluoroelastomer surface, which can reduce stickiness. For example, U.S. Pat. No. 4,981,912 (Kurihara) teaches a fluoroelastomer which is cured with a first crosslinking agent then the surface is contacted with a second crosslinking agent such that a first partial crosslink density has a uniform density across the shaped article while a second partial crosslink density continuously decreases from the surface toward the interior of the shaped article.

There is a desire to identify halogenated materials that have reduced stickiness. In one embodiment, the materials would not involve additional process steps, cure faster, and/or are more cost effective to produce. Additionally, or alternatively, the materials have good mechanical properties, such as improved durability, and good chemical resistance, such as resistance to steam, water, and/or acids.

In one aspect, a curable partially halogenated elastomer gum composition is described, the composition comprising:
(a) a partially halogenated elastomeric gum comprising a polymer, the polymer comprising (i) at least 25% halogen by weight, wherein the halogen is at least one of fluorine and chlorine and (ii) a plurality of cure sites wherein the cure sites are selected from at least one of iodine, bromine, and nitrile;
(b) at least 0.01 parts by mass of a silicon-containing compound per 100 parts by mass of the partially halogenated elastomeric gum;
(c) a dehydrohalogenation agent; and
(d) a curing system, wherein the curing system consists essentially of a peroxide and a coagent.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term
"a", "an", and "the" are used interchangeably and mean one or more; and
"and/or" is used to indicate one or both stated cases may occur, for example A and/or B includes, (A and B) and (A or B);
"backbone" refers to the main continuous chain of the polymer and excludes the terminal ends of the polymer, where the polymerization was initiated or terminated;
"copolymer" refers to a polymer comprising repeating units derived from the recited monomers (comonomers) without excluding the option of other repeating units being present that derive from other monomers (comonomers) not explicitly recited, such as terpolymers or quadpolymers;
"crosslinking" refers to connecting two pre-formed polymer chains using chemical bonds or chemical groups;
"interpolymerized" refers to monomers that are polymerized together to form a polymer backbone;
"monomer" is a molecule which can undergo polymerization which then form part of the essential structure of a polymer;
"organic" has the common meaning in the art, for example, organic compounds are carbon-containing compounds with some exceptions/exclusions including: binary compounds such as carbides, carbon oxides, carbon disulfide; ternary compounds such as metallic cyanides, phosgene, carbonyl sulfide; and metallic carbonates, such as calcium carbonate.
"perfluorinated" means a group or a compound derived from a hydrocarbon wherein all hydrogen atoms have been replaced by fluorine atoms. A perfluorinated compound may however still contain other atoms than fluorine and carbon atoms, like oxygen atoms, chlorine atoms, bromine atoms and iodine atoms; and
"polymer" refers to a macrostructure having a number average molecular weight (Mn) of at least 20,000 daltons, at least 3,000 daltons, at least 50,000 dalton, at least 100,000 dalton, at least 300,000 dalton, at least 500,000 dalton, at least, 750,000 dalton, at least 1,000,000 dalton, or even at least 1,500,000 dalton and not such a high molecular weight as to cause premature gelling of the polymer.

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

Herein, it has been discovered that a superficial layer comprising silicon formed at or near the surface of the elastomer can occur when peroxide curing a halogenated elastomer under certain processing and formulation conditions. Partially halogenated elastomers comprising such a superficial layer have been found to have reduced stickiness, improved durability, improved chemical resistance, and/or faster cure speed.

Silicon-Containing Compound

The silicon-containing compound of the present disclosure is a compound that comprises silicon, including silicon metalloids. The silicon-containing compound may be hydrated, hydroxylated, or crosslinked. In one embodiment, the silicon-containing compound comprises Si—O—X wherein X is an organic group or another metal compound, such as Si, Al, B, etc. The number of Si—O—X bonds surrounding the Si atom can be 1, 2, 3, or 4.

The silicon-containing compound of the present disclosure can be amorphous, crystalline, semi-crystalline, or a glass ceramic, where glass ceramics have an amorphous phase and one or more crystalline phases.

In one embodiment, the silicon-containing compound of the present disclosure is a particulate, meaning that individual particles of the silicon-containing compound are observed. In one embodiment, the silicon-containing compounds are nanoparticles, having an average diameter of at least 3 nm, 5 nm, 10 nm, 15 nm, or even 25 nm; at most about 50 nm, 100 nm, 200 nm, or even 500 nm. In one embodiment, the silicon-containing compounds are microparticles, having an average diameter of at least 0.5 micron (μm), 0.7 μm, 1 μm, or even 2 μm; at most about 50 μm, 100 μm, 500 μm, 750 μm, or even 1 mm. The diameters listed above are for the primary particle size. In some embodiments, the primary particles can be aggregated or agglomerated together to form larger particles, wherein the primary particles are essentially irreversibly bonded together in the form of aggregate. In materials such as fumed silica, pyrogenic silica, and precipitated silica which form aggregate, it is not possible to straightforwardly separate the aggregates into their individual primary particles. The average particle size may be determined using techniques known in the art such as light scatter or microscopy. In one embodiment, the particles are spherically shaped. However, in some embodiments, the particle may be non-spherical in shape such as a whicker, platelet, or fiber, engineered shapes, or even irregular in shapes. In one embodiment, the particles are hollow, such as a glass bubble, which comprises a glass shell and a hollow core. In one embodiment, the particles are solid throughout and substantially free of bubbles. In one embodiment, the inorganic silicon-containing particulates are surface treated with organic moieties, such as particles treated with a dimethyl, dichloro silane.

Exemplary silicon-containing compounds include: metal silicates such as calcium silicate, sodium silicate, borosilicate, lithium disilicate, and potassium silicate; glasses such as soda lime glass, borosilicate glass, Z-glass, E-glass, titanate- and aluminate-based glasses; glass beads; glass frit; silica such as fumed silica, pyrogenic silica, precipitated silica, and silica fume, metal silicon, and combinations thereof.

Examples of commercially available silicon-containing compounds include glass available under the trade designation "NEXTERION GLASS D" from Schott Industries, Kansas City, Mo., and glass available under the trade designation "PYREX" from Corning Incorporated, New York, N.Y.; colloidal silica sols available from Nalco Chemical Co. (Naperville, Ill.) under the trade designation "NALCO COLLOIDAL SILICAS", such as NALCO products 1040, 1042, 1050, 1060, 2327 and 2329; fumed silica available under the trade designations "AERMIL" and "AEROSIL 972" from Evonik Degussa Corp., Essen, Germany and "CAB—O-SIL TS 530" available from Cabot Corp., Boston, Mass.; precipitated silica available under the "HI-SIL" trade designations such as HI-SIL 210, HI-SIL 233, HI-SIL 532EP, and HI-SIL ABS, and Silene 732D, which are all available from PPG Industries, Pittsburgh, Pa.; fused silica available from under the trade designations "3M FUSED SILICA 550", "3M FUSED SILICA 20", and "3M FUSED SILICA 40" available from 3M Co.; glass beads available from under the trade designations "3M REFLECTIVE GLASS BEADS" available from 3M Co.; hollow glass bubbles available under the trade designation "3M GLASS BUBBLES iM16K" from 3M Co., St. Paul, Minn. and those available under the trade designations "Q-CEL" and "SHERICEL" from Potters Industries, LLC, Valley Forge, Pa.; ceramic microspheres available under the trade designation "3M CERAMIC MICROSPHERES W-210", "3M CERAMIC MICROSPHERES W-410", and "3M CERAMIC MICROSPHERES W-610" all available from 3M Company, St. Paul, Minn.; silicon dioxide available under the trade designation "AEMIL 90" from Evonik Degussa Corp.; ground quartz available under the trade designation "MIN—U-SIL 5M" available from U.S. Silica Co., Frederick, Md.; and silica aerogel powders available under the trade designation "JIOS AEROVA AEROGEL POWDER" available from JIOS Aerogel USA, Inc., Irvine, Calif. and "LUMIRA" and "ENOVA" aerogels available from Cabot Corp., Boston, Mass.

Commercially available silicates include: magnesium silicate available under the trade designation "MIITRON VAPOR R" and "TALC" available from Luzenac America Inc., Three Forks, Mont.; calcium silicate available under the trade designations "NYAD", "NYGLOS", "WOLLASTOCOAT", and "WOLLASTOKUP" available from NYCO Minerals, Willsboro, N.Y.; and sodium aluminosilicate available under the trade designation "ZEOLEX" from J. M. Huber Corp., Edison, N.J.

In one embodiment, the silicon-containing compound is not a particulate. In one embodiment, the silicon-containing compound is a liquid at ambient conditions. Non-particulate silicon-containing compounds include alkoxides, for example, alkoxysilanes such as tetraethylorthosilicate (TEOS), methyltrimethoxysilane, alkytrialkoxysilane, and oligomers thereof.

In one embodiment, the silicon-containing compound is used in an amount from at least 0.01, 0.05, 0.1, 0.2, 0.5, or even 1 parts per 100 parts of the partially halogenated elastomeric gum. In one embodiment, the silicon-containing compound is used in an amount less than 10, 7, 5, or even 3 parts per 100 parts of the partially halogenated elastomeric gum. Because the silicon-containing compound may have different activity, in the present disclosure, the amount of silicon-containing compound can depend on the silicon-containing compound used. Such factors that may influence the activity include, which silicon-containing compound is used, the surface area of the silicon-containing compound if a particulate, and/or the amount of Si and/or SiO available for reaction.

Partially Halogenated Elastomeric Gum

As used herein the phrase "elastomeric gum" refers to a polymer that can be processed as a traditional elastomer. To be processed as a traditional elastomer means that the polymer can be processed with a two-roll mill or an internal mixer. Mill blending is a process that rubber manufacturers use to combine the polymer gum with the requisite curing agents and/or additives. In order to be mill blended, the elastomeric gum must have a sufficient modulus. In other words, not too soft that it sticks to the mill, and not too stiff that it cannot be banded onto mill. In one embodiment, the partially halogenated elastomeric gum of the present disclosure has a modulus of at least 0.1, 0.3, or even 0.5 MPa (megaPascals); and at most 2.5, 2.2, or even 2.0 MPa at 100° C. as measured at a strain of 1% and a frequency of 1 Hz (Hertz).

The elastomeric gum is partially halogenated (meaning that the carbons on the polymer backbone comprise both hydrogen and halogen atoms). In one embodiment, the elastomeric gum is partially halogenated (i.e., is not per halogenated) and comprises at least 25, 40, 50, 60, 70, or even 72% halogen by weight, wherein the halogens are fluorine and/or chlorine. In one embodiment, the partially halogenated elastomeric gum comprises at least 40%, 50%, 60%, or even 70% C-halogen bonds relative to the total C—H bonds in the polymer backbone. In some embodiments, other atoms are present along the polymer backbone including, e.g., catenated oxygen atoms (i.e., ether linkages).

Exemplary partially halogenated elastomeric gums include fluoropolymers and/or chlorinated polymers.

Amorphous chlorinated polymers include epichlohydrin polymers, chloropolyethylene (CM) and chlorosulfonyl polyethylene (CSM). Exemplary epichlohydrin polymers include polychloromethyl oxirane (epichlorohydrin polymer, CO), ethylene oxide and chlorometyl oxirane (epichlorohydrin copolymer, ECO) and epichlorohydrin-ethylene oxide-allylglycidylether (epichlorohydrin terpolymer, GECO).

In one embodiment, the elastomeric gum may be derived from one or more fluorinated monomer(s) optionally in combination with one or more non-fluorinated monomers. Examples of fluorinated monomers include fluorinated $C_2$-$C_8$ olefins that may have hydrogen and/or chlorine atoms such as tetrafluoroethylene (TFE), chlorotrifluoroethylene (CTFE), 2-chloropentafluoropropene, dichlorodifluoroethylene, vinyl fluoride, vinylidene fluoride (VDF) and fluorinated alkyl vinyl monomers such as hexafluoropropylene (HFP); fluorinated vinyl ethers, including perfluorinated vinyl ethers (PVE) and fluorinated allyl ethers including perfluorinated allyl ethers. Suitable non-fluorinated comonomers include vinyl chloride, vinylidene chloride and $C_2$-$C_8$ olefins such as ethylene (E) and propylene (P).

Examples of perfluorinated vinyl ethers that can be used in the disclosure include those that correspond to the formula:

$$CF_2=CFO(R_{f'}—O)_mR_f \quad (I)$$

where $R_{f'}$ is a linear or branched perfluoroalkylene radical groups comprising 2, 3, 4, 5, or 6 carbon atoms, m is an integer selected from 0, 1, 2, 3, 4, 5, 6, 7, 8, 9, and 10, and $R_f$ is a perfluoroalkyl group comprising 1, 2, 3, 4, 5, or 6 carbon atoms. Exemplary perfluorovinyl ether monomers include: perfluoro (methyl vinyl) ether (PMVE), perfluoro (ethyl vinyl) ether (PEVE), perfluoro (n-propyl vinyl) ether (PPVE-1), perfluoro-2-propoxypropylvinyl ether (PPVE-2), perfluoro-3-methoxy-n-propylvinyl ether, perfluoro-2-methoxy-ethylvinyl ether, perfluoro-methoxy-methylvinylether ($CF_3$—O—$CF_2$—O—$CF=CF_2$), and $CF_3$—($CF_2$)$_2$—O—$CF(CF_3$)—$CF_2$—O—$CF(CF_3$)—$CF_2$—O—$CF=CF_2$, and combinations thereof.

Examples of perfluorinated allyl ethers that can be used in the disclosure include those that correspond to the formula

$$CF_2=CFCF_2O(R_{f'}O)_n(R_fO)_mR_f \quad (II)$$

where $R_{f'}$ and $R_f$ are independently linear or branched perfluoroalkylene radical groups comprising 2, 3, 4, 5, or 6 carbon atoms, m and n are independently an integer selected from 0, 1, 2, 3, 4, 5, 6, 7, 8, 9, and 10, and $R_f$ is a perfluoroalkyl group comprising 1, 2, 3, 4, 5, or 6 carbon atoms. Exemplary perfluoroallyl ether monomers include: perfluoro (ethyl allyl) ether, perfluoro (n-propyl allyl) ether, perfluoro-2-propoxypropyl allyl ether, perfluoro-3-methoxy-n-propylallyl ether, perfluoro-2-methoxy-ethyl allyl ether, perfluoro-methoxy-methyl allyl ether, and $CF_3$—($CF_2$)$_2$—O—$CF(CF_3$)—$CF_2$—O—$CF(CF_3$)—$CF_2$—O—$CF_2CF=CF_2$, and combinations thereof.

Suitable fluoroalkyl vinyl monomers correspond to the general formula:

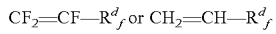

$$CF_2=CF—R_f^d \text{ or } CH_2=CH—R_f^d$$

wherein $R_f^d$ represents a perfluoroalkyl group of 1 to 10, preferably 1 to 5 carbon atoms. A typical example of a fluoroalkyl vinyl monomer is hexafluoropropylene.

In one embodiment, the partially halogenated elastomeric gum comprises interpolymerized units derived from VDF. In one embodiment, the partially halogenated elastomeric gum is derived from 25-65 wt % VDF or even 35-60 wt % VDF.

In one embodiment, the partially halogenated elastomeric gum also comprises carbon-carbon double bonds and/or is capable of forming carbon-carbon double bonds along the polymer chain. In one embodiment, the partially halogenated elastomeric gum comprises carbon-carbon double bonds along the backbone of the polymer or is capable of forming carbon-carbon double bonds along the backbone of the polymer. In another embodiment, the partially halogenated elastomeric gum comprises carbon-carbon double bonds or is capable of forming carbon-carbon double bonds in a pendent group off of the backbone of the polymer.

A polymer capable of forming carbon-carbon double bonds means that the polymer contains units capable of forming double bonds. Such units include, for example, two adjacent carbons, along the polymer backbone or pendent side chain, wherein a hydrogen is attached to the first carbon and a leaving group is attached to the second carbon. During an elimination reaction (e.g., thermal reaction, and/or use of acids or bases), the leaving group and the hydrogen leave forming a double bond between the two carbon atoms. An exemplary leaving group includes: a halide, an alkoxide, a hydroxide, a tosylate, a mesylate, an amine, an ammonium, a sulfide, a sulfonium, a sulfoxide, a sulfone, and combinations thereof.

It is known by those of skill in the art to modify the partially halogenated elastomeric gum during the polymer formation by the addition of small amounts of other copolymerizable monomers, which may or may not contain fluorine substitution, e.g. ethylene, propylene, butylene and the like. Use of these additional monomers (i.e., comonomers) is within the scope of the present disclosure. Generally, these additional monomers would be used at less than 25 mole percent of in the partially halogenated elastomeric gum, preferably less than 10 mole percent, and even less than 3 mole percent.

In one embodiment, the partially halogenated elastomeric gum is a random copolymer, which is amorphous, meaning that there is an absence of long-range order (i.e., in long-range order the arrangement and orientation of the macromolecules beyond their nearest neighbors is understood). An amorphous polymer has no detectable crystalline character by DSC (differential scanning calorimetry), meaning that if studied under DSC, the polymer would have no melting point or melt transitions with an enthalpy more than 0.002, 0.01, 0.1, or even 1 Joule/g from the second heat of a heat/cool/heat cycle, when tested using a DSC thermogram with a first heat cycle starting at −85° C. and ramped at 10° C./min to 350° C., cooling to −85° C. at a rate of 10° C./min and a second heat cycle starting from −85° C. and ramped at 10° C./min to 350° C. Exemplary amorphous random fluorinated copolymers may include: copolymers comprising TFE and perfluorinated vinyl ethers monomeric units (such as copolymers comprising TFE and PMVE, and copolymers comprising TFE and PEVE); copolymers comprising TFE and perfluorinated allyl ethers monomeric units; copolymers comprising TFE and propylene monomeric units; copolymers comprising TFE, propylene, and VDF monomeric units; copolymers comprising VDF and HFP monomeric units; copolymers comprising TFE, VDF, and HFP monomeric units; copolymers comprising TFE and ethyl vinyl ether (EVE) monomeric units; copolymers comprising TFE and butyl vinyl ether (BVE) monomeric units; copolymers comprising TFE, EVE, and BVE monomeric units; copolymers comprising VDF and perfluorinated vinyl ethers monomeric units (such as copolymers comprising VDF and $CF_2$=$CFOC_3F_7$) monomeric units; an ethylene and HFP monomeric units; copolymers comprising CTFE and VDF monomeric units; copolymers comprising TFE and VDF monomeric units; copolymers comprising TFE, VDF and perfluorinated vinyl ethers monomeric units (such as copolymers comprising TFE, VDF, and PMVE) monomeric units; copolymers comprising VDF, TFE, and propylene monomeric units; copolymers comprising TFE, VDF, PMVE, and ethylene monomeric units; copolymers comprising TFE, VDF, and perfluorinated vinyl ethers monomeric units (such as copolymers comprising TFE, VDF, and $CF_2$=$CFO(CF_2)_{30}CF_3$) monomeric units; and combinations thereof. In one embodiment, the fluorinated polymer is not a copolymer comprising VDF and HFP monomeric units.

In one embodiment, the partially halogenated elastomeric gum is a block copolymer in which chemically different blocks or sequences are covalently bonded to each other, wherein the blocks have different chemical compositions and/or different glass transition temperatures. In one embodiment, the block copolymer comprises a first block, A block, which is a semi-crystalline segment. If studied under a differential scanning calorimetry (DSC), this block would have at least one melting point temperature ($T_m$) of greater than 70° C. and a measurable enthalpy, for example, greater than 0 J/g (Joules/gram). The second block, or B block, is an amorphous segment, meaning that there is an absence of long-range order (i.e., in long-range order the arrangement and orientation of the macromolecules beyond their nearest neighbors is understood). The amorphous segment has no detectable crystalline character by DSC. If studied under DSC, the B block would have no melting point or melt transitions with an enthalpy more than 2 milliJoules/g by DSC. In one embodiment, the A block is copolymer derived from at least the following monomers: tetrafluoroethylene (TFE), hexafluoropropylene (HFP), and vinylidene fluoride (VDF). In one embodiment, the A block comprises 30-85 wt (weight) % TFE; 5-40 wt % HFP; and 5-55 wt % VDF; 30-75 wt % TFE; 5-35 wt % HFP; and 5-50 wt % VDF; or even 40-70 wt % TFE; 10-30 wt % HFP; and 10-45 wt % VDF. In one embodiment, the B block is a copolymer derived from at least the following monomers: hexafluoropropylene (HFP), and vinylidene fluoride (VDF). In one embodiment, the B block comprises 25-65 wt % VDF and 15-60 wt % HFP; or even 35-60 wt % VDF and 25-50 wt % HFP. Monomers, in addition, to those mentioned above, may be included in the A and/or B blocks. Generally, the weight average of the A block and B block are independently selected from at least 1000, 5000, 10000, or even 25000 daltons; and at most 400000, 600000, or even 800000 daltons. Such block copolymers are disclosed in WO 2017/013379 (Mitchell et al.); and U.S. Provisional Appl. Nos. 62/447,675, 62/447,636, and 62/447,664, each filed 18 Jan. 2017; all of which are incorporated herein by reference.

The partially halogenated elastomeric gum of the present disclosure contains cure sites which facilitate cross-linking of the polymer in a peroxide cure system. These cure sites comprise at least one of iodine, bromine, and/or nitrile. The polymer may be polymerized in the presence of a chain transfer agent and/or cure site monomers to introduce cure sites into the polymer. Such cure site monomers and chain transfer agents are known in the art. Exemplary chain transfer agents include: an iodo-chain transfer agent, a bromo-chain transfer agent, or a chloro-chain transfer agent. For example, suitable iodo-chain transfer agent in the polymerization include the formula of $RI_x$, where (i) R is a perfluoroalkyl or chloroperfluoroalkyl group having 3 to 12 carbon atoms; and (ii) x=1 or 2. The iodo-chain transfer agent may be a perfluorinated iodo-compound. Exemplary iodo-perfluoro-compounds include 1,3-diiodoperfluoropropane, 1,4-diiodoperfluorobutane, 1,6-diiodoperfluorohexane, 1,8-diiodoperfluorooctane, 1,10-diiodoperfluorodecane, 1,12-diiodoperfluorododecane, 2-iodo-1,2-dichloro-1,1,2-trifluoroethane, 4-iodo-1,2,4-trichloroperfluorobutan, and mixtures thereof. In some embodiments, the iodo-chain transfer agent is of the formula $I(CF_2)_n$—O—$R_f$—$(CF_2)_m$I, wherein n is 1, 2, 3, 4, 5, 6, 7, 8, 9, or 10, m is is 1, 2, 3, 4, 5, 6, 7, 8, 9, or 10 and $R_f$ is a partially fluorinated or perfluorinated alkylene segment, which can be linear or branched and optionally comprises at least one catenated ether linkage. Exemplary compounds include: I—$CF_2$—$CF_2$—O—$CF_2$—$CF_2$—I, I—$CF(CF_3)$—$CF_2$—O—$CF_2$—$CF_2$—I, I—$CF_2$—$CF_2$—O—$CF(CF_3)$—$CF_2$—O—$CF_2$—$CF_2$—I, I—$(CF(CF_3)$—$CF_2$—O$)_2$—$CF_2$—$CF_2$—I, I—$CF_2$—$CF_2$—O—$(CF_2)_2$—O—$CF_2$—$CF_2$—I, I—$CF_2$—$CF_2$—O—$(CF_2)_3$—O—$CF_2$—$CF_2$—I, and I—$CF_2$—$CF_2$—O—$(CF_2)_4$—O—$CF_2$—$CF_2$—I, I—$CF_2$—$CF_2$—$CF_2$—O—$CF_2$—$CF_2$—I, and I—$CF_2$—$CF_2$—$CF_2$—O—CF$(CF_3)$—$CF_2$—O—$CF_2$—$CF_2$—I, In some embodiments, the bromine is derived from a brominated chain transfer agent of the formula: $RBr_x$, where (i) R is a perfluoroalkyl or chloroperfluoroalkyl group having 3 to 12 carbon atoms; and (ii) x=1 or 2. The chain transfer agent may be a perfluorinated bromo-compound.

Cure site monomers, if used, comprise at least one of a bromine, iodine, and/or nitrile cure moiety.

In one embodiment, the cure site monomers may be of the formula: (a) $CX_2$=$CX(Z)$, wherein: (i) X each is independently H or F; and (ii) Z is I, Br, $R_f$—U wherein U=I or Br and $R_f$=a perfluorinated or partially perfluorinated alkylene group optionally containing ether linkages or (b) $Y(CF_2)_qY$, wherein: (i) Y is Br or I or Cl and (ii) q=1-6. In addition, non-fluorinated bromo- or iodo-olefins, e.g., vinyl iodide and allyl iodide, can be used. Exemplary cure site monomers include: $CH_2$=CHI, $CF_2$=CHI, $CF_2$=CFI, $CH_2$=CHCH$_2$I, $CF_2$=$CFCF_2$I, $ICF_2CF_2CF_2CF_2$I, $CH_2$=CHCF$_2$CF$_2$I, $CF_2$=CFCH$_2$CH$_2$I, $CF_2$=CFCF$_2$CF$_2$I, $CH_2$=CH(CF$_2$)$_6$CH$_2$CH$_2$I, $CF_2$=CFOCF$_2$CF$_2$I, $CF_2$=CFOCF$_2$CF$_2$CF$_2$I, $CF_2$=CFOCF$_2$CF$_2$CH$_2$I, $CF_2$=CFCF$_2$OCH$_2$CH$_2$I, $CF_2$=CFO(CF$_2$)$_3$—OCF$_2$CF$_2$I, $CH_2$=CHBr, $CF_2$=CHBr, $CF_2$=CFBr, $CH_2$=CHCH$_2$Br, $CF_2$=CFCF$_2$Br, $CH_2$=CHCF$_2$CF$_2$Br, $CF_2$=CFOCF$_2$CF$_2$Br, $CF_2$=CFCl, I—$CF_2$—$CF_2$CF$_2$—O—CF=CF$_2$, I—$CF_2$—$CF_2$CF$_2$—O—$CF_2$CF=CF$_2$, I—$CF_2$—$CF_2$—O—$CF_2$—CF=CF$_2$, I—$CF(CF_3)$—$CF_2$—O—CF=CF$_2$, I—$CF(CF_3)$—$CF_2$—O—$CF_2$—CF=CF$_2$, I—$CF_2$—$CF_2$—O—$CF(CF_3)$—$CF_2$—O—CF=CF$_2$, I—$CF_2$—$CF_2$—O—$CF(CF_3)$—$CF_2$—O—$CF_2$—CF=CF$_2$, I—$CF_2$—$CF_2$—(O—$(CF(CF_3)$—$CF_2$)$_2$—O—CF=CF$_2$, I—$CF_2$—$CF_2$—(O—$(CF(CF_3)$—$CF_2$)$_2$—O—$CF_2$—CF=CF$_2$, Br—$CF_2$—$CF_2$—O—$CF_2$—CF=CF$_2$, Br—CF$(CF_3)$—$CF_2$—O—CF=CF$_2$, I—$CF_2$—$CF_2$—$CF_2$—O—CF$(CF_3)$—$CF_2$—O—CF=CF$_2$, I—$CF_2$—$CF_2$—$CF_2$—O—CF$(CF_3)$—$CF_2$—O—$CF_2$—CF=CF$_2$, I—$CF_2$—$CF_2$—(O—$(CF(CF_3)$—$CF_2$)$_2$—O—CF=CF$_2$, I—$CF_2$—$CF_2$—$CF_2$—O—$(CF(CF_3)$—$CF_2$—O$)_2$—$CF_2$—

$CF=CF_2$, $Br-CF_2-CF_2-CF_2-O-CF=CF_2$, $Br-CF_2-CF_2-CF_2-O-CF_2-CF=CF_2$, $I-CF_2-CF_2-O-(CF_2)_2-O-CF=CF_2$, $I-CF_2-CF_2-O-(CF_2)_3-O-CF=CF_2$, $I-CF_2-CF_2-O-(CF_2)_4-O-CF=CF_2$, $I-CF_2-CF_2-O-(CF_2)_2-O-CF_2-CF=CF_2$, $I-CF_2-CF_2-O-(CF_2)_3-O-CF_2-CF=CF_2$, $I-CF_2-CF_2-O-(CF_2)_2-O-CF(CF_3)CF_2-O-CF_2=CF_2$, $I-CF_2-CF_2-O-(CF_2)_2-O-CF(CF_3)CF_2-O-CF_2-CF_2=CF_2$, $Br-CF_2-CF_2-O-(CF_2)_2-O-CF=CF_2$, $Br-CF_2-CF_2-O-(CF_2)_3-O-CF=CF_2$, $Br-CF_2-CF_2-O-(CF_2)_4-O-CF=CF_2$, and $Br-CF_2-CF_2-O-(CF_2)_2-O-CF_2-CF=CF_2$.

In another embodiment, the cure site monomers comprise nitrile-containing cure moieties. Useful nitrile-containing cure site monomers include nitrile-containing fluorinated olefins and nitrile-containing fluorinated vinyl ethers, such as: perfluoro(8-cyano-5-methyl-3,6-dioxa-1-octene); $CF_2=CF-O-(CF_2)_n-CN$ where n=2-12, preferably 2, 3, 4, 5, or 6. Examples of a nitrile-containing cure site monomer include $CF_2=CF-O-[CF_2-CF(CF_3)-O]_n-CF_2-CF(CF_3)-CN$; where n is 0, 1, 2,3, or 4, preferably 0, 1, or 2; $CF_2=CF-[OCF_2CF(CF_3)]_x-O-(CF_2)_n-CN$; where x is 1 or 2, and n is 1, 2, 3, or 4; and $CF_2=CF-O-(CF_2)_n-O-CF(CF_3)CN$ where n is 2, 3, or 4. Exemplary nitrile-containing cure site monomers include: $CF_2=CFO(CF_2)_5CN$, $CF_2=CFOCF_2CF(CF_3)OCF_2CF_2CN$, $CF_2=CFOCF_2CF(CF_3)OCF_2CF(CF_3)CN$, $CF_2=CFOCF_2CF_2CF_2OCF(CF_3)CN$, $CF_2=CFOCF_2CF(CF_3)OCF_2CF_2CN$; and combinations thereof.

In one embodiment, the partially halogenated elastomeric gum of the present disclosure comprises at least 0.1, 0.5, 1, 2, or even 2.5 wt % of iodine, bromine, and/or nitrile groups versus the total weight of partially halogenated elastomeric gum. In one embodiment, the partially halogenated elastomeric gum comprises no more than 3, 5, or even 10 wt % of iodine, bromine, and/or nitrile groups versus the total weight of the partially halogenated elastomeric gum.

Dehydrohalogenation Agent

The curable compositions of the present disclosure comprise a dehydrohalogenation agent, which is used to generate hydrogen halides (e.g., HF) from the partially halogenated elastomeric gum. Dehydrohalogenation agents include basic compounds that are capable of generating HCl and/or HF from the partially halogenated elastomeric gum. Dehydrohalogenation agents include onium hydroxide basic solutions, alkoxides, and/or organic amines, which induce dehydrofluorination of the partially halogenated elastomeric gum. Examples of specific dehydrohalogenation agents useful herein include, but are not limited to, sodium hydroxide, potassium hydroxide, lithium hydroxide, rubidium hydroxide, quaternary ammonium compounds such as tetrabutylammonium hydroxide and tetrabutylammoniuin halides, secondary or tertiary alkyl amines, etc., as well as mixtures thereof. Aliphatic, heterocyclic or aromatic amines or precursors thereof may be employed, examples of which include, but are not limited to, triethylamine and salts thereof, pyridine and salts thereof, guillotine and salts thereof, hexamethylenediamine and carbamates thereof, 4,4'-bis(aminocyclohexyl)methane and carbamates thereof, and N,N'-dicinnamylidene-1,6-hexamethylenediamine. Of course, mixtures of any of the above described dehydrahalogenation agents can also be employed. Dehydrofluorination of a fluorinated polymer is described in U.S. Pat. No. 4,678,842 (Sandler), herein incorporated by reference.

In one embodiment, the dehydrohalogenating compound is an organo-onium compounds. Organo-onium compounds typically contain at least one heteroatom, i.e., a non-carbon atom such as N, P, S, O, bonded to organic or inorganic moieties and include for example ammonium salts, phosphonium salts and iminium salts. One class of useful quaternary organo-onium compounds broadly comprises relatively positive and relatively negative ions wherein a phosphorus, arsenic, antimony or nitrogen generally comprises the central atom of the positive ion, and the negative ion may be an organic or inorganic anion (e.g., halide, sulfate, acetate, phosphate, phosphonate, hydroxide, alkoxide, phenoxide, bisphenoxide, etc.). Many of the organo-onium compounds are described and known in the art. See, for example, U.S. Pat. No. 4,233,421 (Worm); U.S. Pat. No. 4,912,171 (Grootaert et al.); U.S. Pat. No. 5,086,123 (Guenthner et al.); U.S. Pat. No. 5,262,490 (Kolb et al.); and U.S. Pat. No. 5,929,169 (Jing et al.), herein incorporated by reference. Representative examples include the following individually listed compounds and mixtures thereof:

triphenylbenzyl phosphonium chloride
tributylallyl phosphonium chloride
tributylbenzyl ammonium chloride
tetrabutyl ammonium bromide
triaryl sulfonium chloride
8-benzyl-1,8-diazabicyclo [5,4,0]-7-undecenium chloride
benzyl tris(dimethylamino) phosphonium chloride,
tributyl methoxypropyl phosphonium chloride, and
benzyl(diethylamino)diphenylphosphonium chloride Another class of useful organo-onium compounds include those having one or more pendent fluorinated alkyl groups. Generally, the most useful fluorinated onium compounds are disclosed in U.S. Pat. No. 5,591,804 (Coggio et al.), herein incorporated by reference.

The amount of dehydrohalogenation agent can vary depending on the agent used. Generally, enough dehydrohalogenation agent should be used to cause formation of hydrogen halides. However, too much dehydrohalogenation agent may be detrimental to the final properties of the elastomer. In one embodiment, the amount of dehydrohalogenation agent is at least 0.1, 0.2, 0.5, or even 1 millimole (mmol) per 100 parts of the partially halogenated elastomeric gum; and at most 5, 8, or even 10 mmol per 100 parts of the partially halogenated elastomeric gum.

Peroxide Cure System

The compositions of the present disclosure comprise a peroxide cure system, which includes a peroxide and a coagent.

In one embodiment, the peroxide is an organic peroxide, preferably, a tertiary butyl peroxide having a tertiary carbon atom attached to peroxy oxygen.

Exemplary peroxides include: benzoyl peroxide, dicumyl peroxide, di-tert-butyl peroxide, 2,5-di-methyl-2,5-di-tert-butylperoxyhexane, 2,4-dichlorobenzoyl peroxide, 1,1-bis(tert-butylperoxy)-3,3,5-trimethylchlorohexane, tert-butyl peroxy isopropylcarbonate (TBIC), tert-butyl peroxy 2-ethylhexyl carbonate (TBEC), tert-amyl peroxy 2-ethylhexyl carbonate, tert-hexylperoxy isopropyl carbonate, carbonoperoxoic acid, O,O'-1,3-propanediyl OO,OO'-bis(1,1-dimethylethyl) ester, tert-butylperoxy benzoate, t-hexyl peroxy-2-ethylhexanoate, t-butyl peroxy-2-ethylhexanoate, di(4-methylbenzoyl) peroxide, laurel peroxide and cyclohexanone peroxide. Other suitable peroxide curatives are listed in U.S. Pat. No. 5,225,504 (Tatsu et al.).

The amount of peroxide used generally will be at least 0.1, 0.2, 0.4, 0.6, 0.8, 1, 1.2, or even 1.5; at most 2, 2.25, 2.5, 2.75, 3, 3.5, 4, 4.5, 5, or even 5.5 parts by weight per 100 parts by weight of the partially halogenated elastomeric gum.

Coagents are reactive additives used to improve the peroxide curing efficiency by rapidly reacting with radicals and potentially suppressing side reactions and/or generating additional crosslinks. The coagent forms a radical through hydrogen abstraction or addition of a radical from the peroxide, which can then react with the polymer through the Br, I, and/or nitrile sites. The coagents are multifunctional polyunsaturated compounds, which are known in the art and include allyl-containing cyanurates, isocyanurates, and phthalates, homopolymers of dienes, and co-polymers of dienes and vinyl aromatics. A wide variety of useful coagents are commercially available including di- and tri-allyl compounds, di vinyl benzene, vinyl toluene, vinyl pyridine, 1-cis-polybutadiene and their derivatives. Exemplary coagents include a diallyl ether of glycerin, triallylphosphoric acid, diallyl adipate, diallylmelamine and triallyl isocyanurate (TAIC), tri(methyl)allyl isocyanurate (TMAIC), tri(methyl)allyl cyanurate, poly-triallyl isocyanurate (poly-TAIC), xylylene-bis(diallyl isocyanurate) (XBD), N,N'-m-phenylene bismaleimide, diallyl phthalate, tris(diallylamine)-s-triazine, triallyl phosphite, 1,2-polybutadiene, ethyleneglycol diacrylate, diethyleneglycol diacrylate, and combinations thereof. Exemplary partially fluorinated compounds comprising two terminal unsaturation sites include: $CH_2=CH-R_{f1}-CH=CH_2$ wherein $R_{f1}$ may be a perfluoroalkylene of 1 to 8 carbon atoms and a fluorine-containing TAIC such as those disclosed in U.S. Pat. No. 6,191,233 (Kishine et al.).

The amount of coagent used generally will be at least 0.1, 0.5, or even 1 part by weight per 100 parts by weight of the partially halogenated elastomeric gum; and at most 2, 2.5, 3, or even 5 parts by weight per 100 parts by weight of the partially halogenated elastomeric gum.

Other Additives

For the purpose of, for example, enhancing the strength or imparting the functionality, conventional adjuvants, such as, for example, process aids (such as waxes, carnauba wax); plasticizers such as those available under the trade designation "STRUKTOL WB222" available from Struktol Co., Stow, Ohio; fillers; and/or colorants may be added to the composition.

Such fillers include: an organic or inorganic filler such as clay, alumina, iron red, talc, diatomaceous earth, barium sulfate, calcium carbonate ($CaCO_3$), calcium fluoride, titanium oxide, and iron oxide, a polytetrafluoroethylene powder, PFA (TFE/perfluorovinyl ether copolymer) powder, an electrically conductive filler, a heat-dissipating filler, and the like may be added as an optional component to the composition. Those skilled in the art are capable of selecting specific fillers at required amounts to achieve desired physical characteristics in the vulcanized compound.

In one embodiment, carbon black is added to the composition. Carbon black fillers are typically employed as a means to balance modulus, tensile strength, elongation, hardness, abrasion resistance, conductivity, and processability of polymer compositions. Suitable examples include MT blacks (medium thermal black) designated N-991, N-990, N-908, and N-907; FEF N-550; and large particle size furnace blacks. When used, 1 to 100 parts by weight of filler per hundred parts by weight of the partially halogenated elastomer gum of large size particle black is generally sufficient.

In one embodiment, the composition comprises less than 40, 30, 20, 15, or even 10% by weight of the inorganic filler per hundred parts by weight of the partially halogenated elastomer gum.

Acid acceptors are typically used in elastomer curing as acid scavenger. Acid acceptors are typically used in elastomer cure reactions involving a dehydrohalogenation cure reaction. Since the present disclosure is directed toward peroxide cured elastomers, in one embodiment, the curable compositions disclosed herein are substantially free of an acid acceptor. In other words, the composition comprises less than 0.1, 0.05, or even 0.01 parts by weight of the acid acceptor per 100 parts by weight of the partially halogenated elastomer gum. In another embodiment, the curable composition can comprise a small amount of acid acceptor, such as less than 5, 3, or even 1 parts by weight per 100 parts by weight of the partially halogenated elastomer gum.

Acid acceptors are typically inorganic bases such as metal oxide or metal hydroxide or a blend of the inorganic base and an organic acid acceptor. Examples of inorganic acceptors include magnesium oxide, lead oxide, calcium oxide, calcium hydroxide, dibasic lead phosphate, zinc oxide, barium carbonate, strontium hydroxide, calcium carbonate, hydrotalcite, etc. Organic acceptors include epoxies, alkali stearates (such as sodium stearate), tertiary amines, and magnesium oxalate.

The partially halogenated elastomeric gums of the present disclosure, are primarily cured via the peroxide cure reaction with the Br, Ir, and/or CN cure sites. In one embodiment, the compositions of the present disclosure comprise a cure system that consists essentially of the peroxide and the coagent. In other words, small amounts of other curatives may be present so long as they do not contribute to the cure of the partially halogenated elastomeric gum, which can be observed as a viscosity increase in response to curing (e.g., heating) of the polymer. In one embodiment, the curable compositions of the present disclosure are substantially free of an amine, triazine and/or bisphenol cure system.

In one embodiment, the curable compositions of the present disclosure comprise less than 1 part by weight per 100 parts by weight of the partially halogenated elastomer gum (phr) of: (i) polyhydroxy curing agent, (ii) crosslinking amines (multifunctional amines), and/or (iii) $CX_1X_2=CX_3$-L-M, wherein $X_1$, $X_2$, and $X_3$ are independently selected from H, Cl, and F and at least one of $X_1$, $X_2$, and $X_3$ is H and at least one is F or Cl, L is a single bond or linking group, and M is a nucleophilic group.

Polyhydroxy compounds include those known in the art to function as a crosslinking agent or co-curative for elastomers, such as those polyhydroxy compounds disclosed in U.S. Pat. No. 3,876,654 (Pattison), and U.S. Pat. No. 4,233,421 (Worm). Representative examples include aromatic polyhydroxy compounds, preferably any one of the following: di-, tri-, and tetrahydroxybenzenes, naphthalenes, and anthracenes, and bisphenols. Exemplary aromatic polyhydroxy compounds include: 4,4'-hexafluoroisopropylidenyl bisphenol, known more commonly as bisphenol AF. Further useful examples include 4,4'-dihydroxydiphenyl sulfone (also known as Bisphenol S) and 4,4'-isopropylidenyl bisphenol (also known as bisphenol A).

Exemplary crosslinking amines include: hexamethylenediamine and a carbamate thereof, 4,4'-bis(aminocyclohexyl) methane and a carbamate thereof, and N,N'-dicinnamylidene-1,6-hexamethylenediamine.

Exemplary curing agents of the formula $CX_1X_2=CX_3$-L-M have been disclosed in WO 2016/100421 (Grootaert et al.) and WO 2016/100420 (Grootaert et al.), incorporated by reference herein. For example, linking group, L, can be a catenated O, S, or N atom (e.g., an ether linkage), or a divalent organic group, optionally comprising a catenated heteroatom (e.g., 0, S or N), and/or optionally substituted.

Exemplary divalent organic groups include: —$CH_2$—$C_6H_4$(O$CH_3$)—, —$CH_2$—O—$CH_2$($CF_2$)$_4$—$CH_2$— and —$CH_2$—O—$C_6H_4$—C($CF_3$)$_2$—$C_6H_4$—, and —$CH_2$—O—$C_6H_4$—C($CF_3$)$_2$—$C_6H_4$—O—$CH_2$—. Exemplary nucleophilic group, M, includes: an alcohol (—OH), an amine (—$NH_2$, —NHR, and —NRR' where R and R' are an organic group), a thiol (—SH), and carboxylic acid (—COOH).

In one embodiment, the curable composition of the present disclosure consists essentially of:
 (a) a partially halogenated elastomeric gum comprising (i) at least 25% halogen by weight, wherein the halogen is at least one of fluorine and chlorine and (ii) a plurality of cure sites wherein the cure sites are selected from at least one of iodine, bromine, and nitrile;
 (b) at least 0.01 parts by mass of a silicon-containing compound per 100 parts by mass of the partially halogenated elastomeric gum;
 (c) a dehydrohalogenation agent; and
 (d) a curing system, wherein the curing system consists essentially of a peroxide and a coagent.

The phrase "consists essentially of" means that the composition comprises the elements listed and may include additional elements not listed so long as they do not materially affect the composition. In other words, if all traces of the non-listed element were removed, the processing (e.g., curing time, extrusion rate, etc.) and final product characteristics (e.g., chemical and thermal resistance, hardness, etc.) of the composition would remain unchanged.

The curable partially halogenated elastomeric gum compositions may be prepared by mixing the partially halogenated elastomeric gum, the silicon-containing compound, the dehydrohalogenation agent, and the peroxide cure system, along with the other components (e.g., additional additives) in conventional rubber processing equipment to provide a solid mixture, i.e. a solid polymer containing the additional ingredients, also referred to in the art as a "compound". This process of mixing the ingredients to produce such a solid polymer composition containing other ingredients is typically called "compounding". Such equipment includes rubber mills, internal mixers, such as Banbury mixers, and mixing extruders. The temperature of the mixture during mixing typically will not rise above about 120° C. During mixing the components and additives are distributed uniformly throughout the resulting polymer "compound" or polymer sheets. The "compound" can then be extruded or pressed in a mold, e.g., a cavity or a transfer mold and subsequently be oven-cured. In an alternative embodiment curing can be done in an autoclave.

Curing is typically achieved by heat-treating the curable partially halogenated elastomeric gum composition. Typically, a first curing is performed followed by a second post curing step.

The first curing is done to crosslink the article to an extent such that the shape can be maintained in order to form (or pre-form) a target shape, which can be further shaped if desired.

The first curing, referred to herein as a press cure, is conducted by exposing the curable composition to temperatures of at least 120, 140, or even 150° C.; and at most 220° C. or even 200° C., for a period of at least 1, 5, 15, 20, or even 30 minutes; and at most 0.75, 1, 5, 10, or even 15 hours using techniques known in the art, such as an injection molding machine, compression molding machine, transfer molding machines, vulcanizing press, extrusion molding followed by salt bath or autoclave curing, or the like. In one embodiment, a pressure of at least 700, 1000, 2000, 3000, or even 3400 kPa; and at most 6800, 7500, 10 000, 15 000, or even 20 000 kPa is typically used in compression molding. The molds first may be coated with a release agent and prebaked.

The second curing step, referred to herein as a post-cure, is conducted for the purpose of completing the cross-linking reaction that was not sufficient in the press cure or gasifying low molecular components in the elastomer for enhanced strength and decreased compression set. Post-cures are typically done at a temperature of at least 120, 140, or even 150° C.; and at most 200, 220, 250 or even 300° C., for a period of at least 10, 15, 30, or even 60 minutes; and at most 2, 5, 10, 15, 24, 36, or even 48 hours depending on the cross-sectional thickness of the sample. For thick sections, the temperature during the post cure is usually raised gradually from the lower limit of the range to the desired maximum temperature. The maximum temperature used is preferably about 260° C., and is held at this value for about 1 hour or more.

In one embodiment, the partially halogenated elastomeric gum has a t'90 (time for the torque to reach $M_L$+0.9($M_H$−$M_L$)) of less than 5, 4, 3, or even 2 min using a Moving Die Rheometer (MDR) in accordance with ASTM D 5289-93a at 177° C., no pre-heat, 30 min elapsed time, and a 0.5 degree arc.

In one embodiment, the cured compositions of the present disclosure have good thermal stability and/or chemical resistance. Thermal stability is the ability of the elastomer to respond to compression. Articles of this disclosure may have a compression set resistance of less than 60, 50, 40, 30, or even less than 20% when tested per ASTM D395-16e1 at 200° C. for 70 hours. Chemical resistance properties of polymers are typically tested with water, steam, and ethylene diamine. Articles of this disclosure may have a resistance to steam of less than 60%, or even less than 50% volume swell when tested at 230° C. for 168 hours when tested per ASTM D-471-06. Articles of this disclosure may have a resistance to water of less than 80%, less than 50%, less than 40%, or even less than 30% volume swell when tested at 230° C. for 168 hours when tested per ASTM D-471-06. Articles of this disclosure may have a resistance to ethylene diamine of less than 50%, less than 45% or even less than 40% volume swell when tested at 100° C. for 168 hours when tested per ASTM D-471-06.

In the present disclosure, it has been discovered that when the molded elastomeric article is post cured, a superficial layer is generated at or near the surface. The superficial layer is silicon-containing and appears to comprise Si—O bonds. In one embodiment, the superficial silicon layer comprises silicon dioxide. In one embodiment, the superficial layer is amorphous silicon. The superficial layer is a layer meaning that it is continuous or substantially continuous (i.e., covers at least 75, 80, 85, 90, 95, or even 99% of the surface) across the surface of the article. The superficial layer is at or near the surface of the cured article, meaning that the superficial layer is at the surface or within 200, 100, 50, or even 10 nm of the surface.

In one embodiment, the cured product has more than 2, 5, 10, or even 20 times greater silicon content at the surface of the superficial silicon layer than the bulk composition, which can be analyzed by XRF (x-ray fluorescence) or FTIR (Fourier Transform infrared spectroscopy).

In one embodiment, the thickness of the superficial layer may be dependent on temperatures used and the amount of time exposed.

To form this superficial layer, the compounded material should comprise a partially halogenated elastomeric gum, a silicon-containing compound, and an effective amount of a dehydrohalogenation agent to enable dehydrohalogenation. To form the superficial layer, it is believed that the partially halogenated elastomeric gum must be exposed to a level of heat for a sufficient amount of time and that the surface must be able to freely liberate gases. In one embodiment, the surface of the molded article is oxidative, in other words comprising oxygen gas, water or some other compound which is able to donate oxygen atoms readily.

In one embodiment, the superficial layer increases in thickness upon longer post cure. In one embodiment, the surface ratio of Si to F compared to the theoretical ratio of Si to F in the bulk increase upon longer post cure times. In one embodiment, the theoretical ratio of Si to halogen (as determined by components in the composition) is at least 0.001, or even 0.005; and no more than 0.01 or even 0.05. In one embodiment, the surface of the cured composition (e.g., the superficial layer) has a ratio of Si to F of at least 0.05, 0.1, 0.2, 0.4, or even 0.5, which can be measured by a wave dispersed X-ray fluorescence (WDXRF) spectrophotometer.

Although not wanting to be limited by theory, it is believed that heating causes the dehydrohalogenation of the partially halogenated elastomeric gum, forming a hydrogen halide such as HF, which abstracts Si from the silicon-containing compound to form, for example, $SiF_4$. This gaseous product then migrates to the surface of the elastomeric gum, where it forms the superficial silicon layer. This process is believed to not only deposit silicon to the surface of the elastomeric part, but also to create a textured surface. The peroxide cure system is used to physically crosslink (or cure) the polymer, The textured surface, which appears as a matte finish on the halogenated elastomer, appears to coincide with the formation of the superficial layer.

Advantageously, the cured compositions of the present disclosure can have low tackiness, low friction, and/or a surface roughness. In one embodiment, the cured compositions have improved wear performance as tested using a ball/pin-on-disk friction test. In one embodiment, the cured compositions have a friction force (Fx) of greater than −1.5, −1.0 or even −0.8 Newton at 1000 rpm for 60 minutes. In one embodiment, the cured compositions have a coefficient of friction (COF) of less than 1.0, 0.75, or even 0.50.

Compositions of the present disclosure may be used in shaped articles, such as an o-ring, a gasket, belts, valves, stoppers, seals, hoses, etc. For example, cured compositions of the present disclosure may be used in rotary shaft seals (such as crank shaft seals), valves (such as solenoid valves, regulator valves, gas on-off valves, water valves), valve stem seals, gas seals, oil seals, fuel cap gaskets, oil level gauges, and hard disk drive components (such as seals, impact absorbing stopper, dampers, gaskets, and balancers).

Cured compositions of the present disclosure may be used in durable surface applications. In one embodiment, the compositions disclosed herein may be made into films which are applied to substrates to provide durability (e.g., abrasion and/or scratch resistance) to the substrate's surface. The substrate, for example, may be in the form of a clothing article or footwear; automobile, marine, or other vehicle seat coverings; automobile, marine, or other vehicle bodies; orthopedic devices; electronic devices (including, for example, track pads, and outer surface cover), hand held devices, and wearable devices (including watches, sensors and monitoring devices); household appliances; sporting goods; and the like. In another embodiment, compositions disclosed herein may be made (e.g., molded) into wearable devices for body parts such wrist, arm, or leg. In one embodiment, such wearable devices include watches, sensors and monitoring devices which may comprise accelerometers, gyroscopes, inertial sensors, global positioning, motion sensors, heart rate monitors, etc.

Exemplary embodiments of the present disclosure include, but should not be limited to, the following:

Embodiment 1

A curable partially halogenated elastomeric gum composition comprising:
(a) a partially halogenated elastomeric gum comprising (i) at least 25% halogen by weight, wherein the halogen is at least one of fluorine and chlorine and (ii) a plurality of cure sites wherein the cure sites are selected from at least one of iodine, bromine, and nitrile;
(b) at least 0.01 parts by mass of a silicon-containing compound per 100 parts by mass of the partially halogenated elastomeric gum;
(c) a dehydrohalogenation agent; and
(d) a curing system, wherein the curing system consists essentially of a peroxide and a coagent.

Embodiment 2

The composition of embodiment 1, wherein the partially halogenated elastomeric gum is a fluorinated amorphous polymer or a chlorinated amorphous polymer.

Embodiment 3

The composition of embodiment 2, wherein fluorinated amorphous polymer comprises interpolymerized vinylidene fluoride monomeric units.

Embodiment 4

The composition of embodiment 2, wherein the fluorinated amorphous polymer comprises at least one of: (i) a copolymer comprising tetrafluoroethylene, vinylidene fluoride, and hexafluoropropylene monomeric units; (ii) a copolymer comprising tetrafluoroethylene, and propylene monomeric units; (iii) a copolymer comprising tetrafluoroethylene, vinylidene fluoride, and propylene monomeric units; and (iv) a copolymer comprising vinylidene fluoride, perfluoro (methyl vinyl) ether, and hexafluoropropylene monomeric units; (v) a copolymer comprising tetrafluoroethylene, vinylidene fluoride, and hexafluoropropylene monomeric units.

Embodiment 5

The composition of any one of embodiments 1-3, wherein the partially halogenated elastomeric gum is a block copolymer comprising at least one A block and at least one B block.

Embodiment 6

The composition of embodiment 5, wherein the A block comprises 30-85 wt % TFE; 5-40 wt % HFP; and 5-55 wt % VDF; and the B block comprises 25-65 wt % VDF and 15-60 wt % HFP; or even 35-60 wt % VDF and 25-50 wt % HFP based on the weight of the fluorinated elastomeric gum.

Embodiment 7

The composition of any one of the previous embodiments, comprising more than 0.1 to less than 1 mmole of the dehydrohalogenation agent per 100 parts of the partially halogenated elastomeric gum.

Embodiment 8

The composition of any one of the previous embodiments, wherein the composition is substantially free of (i) polyyhydroxy curing agent, (ii) crosslinking amines, and (iii) $CX_1X_2=CX_3$-L-M wherein $X_1$, $X_2$, and $X_3$ are independently selected from H, Cl, and F and at least one of $X_1$, $X_2$, and $X_3$ is H and at least one is F or Cl, L is a single bond or linking group, and M is a nucleophilic group.

Embodiment 9

The composition of any one of the previous embodiments, wherein the composition is substantially free of an acid acceptor.

Embodiment 10

The composition of any one of the previous embodiments, wherein the composition comprises less than 5 parts by weight of the silicon-containing compound per 100 parts by weight of the partially halogenated elastomeric gum.

Embodiment 11

The composition of any one of the previous embodiments, wherein the silicon-containing compound is inorganic.

Embodiment 12

The composition of any one of embodiments 1-10, wherein the silicon-containing compound is organic.

Embodiment 13

The composition of any one of the previous embodiments, wherein the silicon-containing compound is a particle.

Embodiment 14

The composition of embodiment 13, wherein the silicon-containing compound is a nanoparticle.

Embodiment 15

The composition of any one of embodiments 13-14, wherein the silicon-containing compound is a glass bubble.

Embodiment 16

The composition of any one of embodiments 1-12, wherein the silicon-containing compound is a liquid.

Embodiment 17

The composition of embodiment 16, wherein the silicon-containing compound is a tetraalkoxysilane.

Embodiment 18

The composition of any one of the previous embodiments, further comprising carbon black.

Embodiment 19

The composition of any one of the previous embodiments, wherein the peroxide is at least one of 2,5-dimethyl-2,5-di (t-butylperoxy)hexane; dicumyl peroxide; di(2-t-butylperoxyisopropyl)benzene; dialkyl peroxide; bis (dialkyl peroxide); 2,5-dimethyl-2,5-di(tertiarybutylperoxy)$_3$-hexyne; dibenzoyl peroxide; 2,4-dichlorobenzoyl peroxide; tertiary-butyl perbenzoate; α,α'-bis(t-butylperoxy-diisopropylbenzene); t-butyl peroxy isopropylcarbonate, t-butyl peroxy 2-ethylhexyl carbonate, t-amyl peroxy 2-ethylhexyl carbonate, t-hexylperoxy isopropyl carbonate, di[1,3-dimethyl-3-(t-butylperoxy)butyl]carbonate, carbonoperoxoic acid, or O,O'-1,3-propanediyl OO,OO'-bis(1,1-dimethylethyl) ester.

Embodiment 20

The composition of any one of the previous embodiments, wherein the composition comprises at least 0.1 and at most 5 parts by weight of the peroxide per 100 parts by weight of the partially halogenated elastomeric gum.

Embodiment 21

The composition of any one of the previous embodiments, wherein the coagent comprises at least one of (i) diallyl ether of glycerin, (ii) triallylphosphoric acid, (iii) diallyl adipate, (iv) diallylmelamine and triallyl isocyanurate, (v) tri(methyl)allyl isocyanurate, (vi) tri(methyl)allyl cyanurate, (vii) poly-triallyl isocyanurate, (viii) xylylene-bis(diallyl isocyanurate), (xi) $CH_2=CH-R_{fl}-CH=CH_2$ wherein $R_{fl}$ may be a perfluoroalkylene of 1 to 8 carbon atoms, and (x) combinations thereof.

Embodiment 22

The composition of any one of the previous embodiments, wherein the composition comprises from 0.1 to 10 parts by weight of the coagent per 100 parts by weight of the partially halogenated elastomeric gum.

Embodiment 23

An article comprising the cured composition according to any one of embodiments 1-22.

Embodiment 24

The article of embodiment 23, wherein the article is at least one of a seal, o-ring, gasket or wearable device.

Embodiment 25

A method of making a partially halogenated elastomer having a superficial layer comprising silicon, the method comprising:
(a) obtaining the composition of any one of embodiments 1-22;
(b) heating the composition in an unrestrained fashion at a temperature of at least 160° C. for at least 15 min.

EXAMPLES

Unless otherwise noted, all parts, percentages, ratios, etc. in the examples and the rest of the specification are by weight, and all reagents used in the examples were obtained, or are available, from general chemical suppliers such as, for example, Sigma-Aldrich Chemical Company, Milwaukee, Wis., USA, or known to those skilled in the art, unless otherwise stated or apparent.

The following abbreviations are used herein: g=grams, cm=centimeters, mm=millimeters, μm=micrometers, mil=thousandths of an inch, wt %=percent by weight, min=minutes, h=hours, N=newtons, FTIR=Fourier Transform infrared, ATR=attenuated total reflection, phr=parts per hundred rubber (by weight), and rpm=revolutions per minute. Abbreviations for materials used in this section, as well as descriptions of the materials, are provided in Table 1.

TABLE 1

| Material | Details |
| --- | --- |
| Fluoropolymer A | A peroxide curable fluoroelastomer with 71% fluorine content and 0.4% of bromine by weight, Mooney Viscosity ML1 + 10 @ 121° C. of 76, available under the trade designation "3M DYNEON FPO 932HB" from 3M Company |
| Fluoropolymer B | A peroxide curable fluoroelastomer is derived from about 15% of TFE, 34% of HFP and 51% of VDF by weight with 0.3% of iodine and 67.5% fluorine content by weight, and Mooney Viscosity ML1 + 10 @ 121° C. of 20. |
| Fluoropolymer C | A peroxide curable fluoroelastomer is derived from about 40% of HFP and 60% of VDF by weight with 0.7% of iodine and 66% fluorine content by weight, and Mooney viscosity ML1 + 10 @ 100° C. of 3.5. |
| TBMPPCl | Tributyl methoxypropyl phosphonium chloride, 85% in MeOH |
| $SiO_2$ | Precipitated silicon dioxide characterized by a median particle size of 40 μm, available under the trade designation "HI-SIL ABS" from PPG Industries, Inc., Monroeville, PA, USA |
| TAIC | A co-agent. Triallyl isocyanurate commercially available under the trade designation "TAIC" from Nippon Kasei Chemical Co. Ltd., Tokyo, Japan. |
| Carbon Black | Carbon black, available under the trade designation "N990" from Cabot, Boston, MA, USA |
| Peroxide | 2,5-Bis(tert-butylperoxy)-2,5-dimethylhexane, 90% active, available from Sigma-Aldrich under the trade designation "LUPEROX 101". |

Characterization Methods

Method for determining presence of $SiO_2$ on surface by FTIR spectrophotometry:

FTIR spectra were measured from the surface of post cured sheets using a Spectrum 100 FTIR (available from Perkin Elmer, Waltham, Mass., USA) with MIRACLE Single Reflection ATR sampling accessory and Ge crystal (both available from Pike Technologies, Madison, Wis., USA). A peak at around 1072 $cm^1$ was assigned to Si—O stretching, while a peak at around 1179 $cm^1$ was assigned to Si—F stretching. In Table 2, below, T refers to a trace peak observed, W refers to a weak peak observed, and S refers to a strong peak observed.

Method for Determining Wear Performance:

Following post curing, disk samples with a diameter of 1.25 in (3.18 cm) were punched from sheets of post cured samples using a circular die. A circle was cut from the center of each sample with a circular die of diameter 5/16 in (0.79 cm). A ball/pin-on-disk friction test was carried out on each sample using a model UMT friction tester (available from CETR, Campbell, Calif., USA) with the following conditions: ambient temperature, 150 g force applied using a ⅜ in (0.95 cm) diameter stainless steel ball, 1000 rpm, 60 min duration, clockwise direction. The reported values for friction force (Fx) and coefficient of friction (COF) are presented in Table 2.

Example 1 (EX-1)

A small amount of $SiO_2$ (0.6 phr) and 85 weight % TBMPPCl (1 phr) were compounded into Fluoropolymer A with other ingredients as indicated in Table 2 using a two roll mill. Then the compound was press-cured as a sheet at 177° C. for 6 min using 3 in (7.62 cm)×6 in (15.2 cm) mold. After press-curing, the sheet was post-cured at 250° C. for four hours, suspended on metal wire in an air circulated oven. The post-cured sheet had a slick, slippery, matte finish surface. EX-1 was characterized as described above under "Method for determining presence of $SiO_2$ on surface by FTIR spectrophotometry" and "Method for determining wear performance." A clear peak at around 1072 $cm^1$ was assigned to Si—O stretching. The Si—O stretching was only observed for EX-1 after post-cure. The characterization results are summarized in Table 2.

Comparative Example 1 (CE-1)

Samples were prepared and characterized as described for EX-1, except CE-1 did not comprise $SiO_2$ or TBMPPCl.

Example 2 (EX-2)

Samples were prepared and characterized as EX-1, except that Fluoropolymer A was replaced with Fluoropolymer B and the amounts of TBMPPCl and $SiO_2$ were as indicated in Table 2.

Example 3 (EX-3), Example 4 (EX-4), and Example 5 (EX-5)

Samples were prepared and characterized as described for EX-2, except the amount of TBMPPCl was as indicated in Table 2.

Comparative Example 2 (CE-2)

Samples were prepared and characterized as described for EX-2, except CE-2 did not comprise $SiO_2$ or TBMPPCl.

Example 6 (EX-6)

Samples were prepared and characterized as described for EX-2, except the amount of TBMPPCl was as indicated in Table 2.

Example 7 (EX-7)

Samples were prepared and characterized as described for EX-6, except Fluoropolymer B was replaced with Fluoropolymer C.

TABLE 2

| | EX-1 | CE-1 | EX-2 | EX-3 | EX-4 | EX-5 | CE-2 | EX-6 | EX-7 |
|---|---|---|---|---|---|---|---|---|---|
| Formulation (amounts listed in phr) | | | | | | | | | |
| Fluoropolymer A | 100 | 100 | — | — | — | — | — | — | — |
| Fluoropolymer B | — | — | 100 | 100 | 100 | 100 | 100 | 100 | — |
| Fluoropolymer C | — | — | — | — | — | — | — | — | 100 |
| TBMPPC1 85% in MeOH | 1 | — | 0.4 | 0.5 | 0.7 | 1 | — | 0.3 | 0.3 |
| $SiO_2$ | 0.6 | — | 0.7 | 0.7 | 0.7 | 0.7 | — | 0.7 | 0.7 |
| TAIC | 2.4 | 2.4 | 2.4 | 2.4 | 2.4 | 2.4 | 2.4 | 2.4 | 2.4 |
| Peroxide | 1 | 1 | 1 | 1 | 1 | 1 | 1 | 1 | 1 |
| Cabon Black | — | — | 30 | 30 | 30 | 30 | 30 | 30 | 30 |
| Si—O surface (FTIR) | | | | | | | | | |
| 1072 $cm^{-1}$ | S | ND | W | W | S | S | ND | T | T |
| 1179 $cm^{-1}$ | ND | S | W | W | ND | ND | S | S | S |
| Abrasion Tribology Test (Fz = −1.5N, 60 min, 1000 rpm) | | | | | | | | | |
| Fx (N) | −0.769 | −1.83 | −1.93 | −1.09 | −0.521 | −0.449 | −2.20 | −2.20 | NT |
| COF | 0.493 | 1.23 | 1.30 | 0.744 | 0.354 | 0.302 | 1.44 | 1.43 | NT |

T = trace, W = weak, and S = strong
ND = not detected
NT = not tested

Foreseeable modifications and alterations of this invention will be apparent to those skilled in the art without departing from the scope and spirit of this invention. This invention should not be restricted to the embodiments that are set forth in this application for illustrative purposes. To the extent that there is any conflict or discrepancy between this specification as written and the disclosure in any document mentioned or incorporated by reference herein, this specification as written will prevail.

What is claimed is:

1. A curable partially halogenated elastomeric gum composition comprising:
   (a) a partially halogenated elastomeric gum comprising (i) at least 25% halogen by weight, wherein the halogen is at least one of fluorine and chlorine and (ii) a plurality of cure sites wherein the cure sites are selected from at least one of iodine, bromine, or nitrile;
   (b) at least 0.01 parts by mass of a silicon-containing compound per 100 parts by mass of the partially halogenated elastomeric gum;
   (c) at least 1 mmol and at most 10 mmol of a dehydrohalogenation agent per 100 parts by mass of the partially halogenated elastomeric gum; and
   (d) a curing system, wherein the curing system consists of a peroxide and a coagent.

2. The composition of claim 1, wherein the partially halogenated elastomeric gum is a fluorinated amorphous polymer or a chlorinated amorphous polymer.

3. The composition of claim 2, wherein fluorinated amorphous polymer comprises interpolymerized vinylidene fluoride monomeric units.

4. The composition of claim 2, wherein the partially halogenated elastomer gum comprises a fluorinated amorphous polymer, the fluorinated amorphous polymer comprises at least one of: (i) a copolymer comprising tetrafluoroethylene, vinylidene fluoride, and hexafluoropropylene monomeric units; (ii) a copolymer comprising tetrafluoroethylene, and propylene monomeric units; (iii) a copolymer comprising tetrafluoroethylene, vinylidene fluoride, and propylene monomeric units; (iv) a copolymer comprising vinylidene fluoride, perfluoro (methyl vinyl) ether, and hexafluoropropylene monomeric units; or (v) a copolymer comprising vinylidene fluoride, and hexafluoropropylene monomeric units.

5. The composition of claim 1, wherein the partially halogenated elastomeric gum is a block copolymer comprising at least one A block and at least one B block.

6. The composition of claim 5, wherein the A block comprises 30-85 wt % TFE; 5-40 wt % HFP; and 5-55 wt % VDF; and the B block comprises 25-65 wt % VDF and 15-60 wt % HFP; or even 35-60 wt % VDF and 25-50 wt % HFP based on the weight of the fluorinated elastomeric gum.

7. The composition of claim 1, wherein the composition comprises less than 5 parts by weight of the silicon-containing compound per 100 parts by weight of the partially halogenated elastomeric gum.

8. The composition of claim 1, wherein the silicon-containing compound is a tetraalkoxysilane.

9. The composition of claim 1, wherein the composition comprises at least 0.1 and at most 5 parts by weight of the peroxide per 100 parts by weight of the partially halogenated elastomeric gum.

10. The composition of claim 1, wherein the composition comprises from 0.1 to 10 parts by weight of the coagent per 100 parts by weight of the partially halogenated elastomeric gum.

11. An article comprising the cured composition according to claim 1.

12. A method of making a partially halogenated elastomer having a superficial layer comprising silicon, the method comprising:
   (a) obtaining the composition of claim 1; and
   (b) heating the composition in an unrestrained fashion at a temperature of at least 160° C. for at least 15 min.

13. The composition of claim 1, wherein the composition is substantially free of an acid acceptor.

14. The composition of claim 1, wherein the silicon-containing compound is inorganic.

15. The composition of claim 1, wherein the silicon-containing compound is organic.

16. The composition of claim 1, wherein the silicon-containing compound is a particle.

17. The composition of claim 1, wherein the silicon-containing compound is a liquid.

18. The article of claim 11, wherein the article is at least one of a seal, o-ring, gasket, or wearable device.

19. The composition of claim 1, comprising at least 1.5 mmol and at most 10 mmol of a dehydrohalogenation agent per 100 parts by mass of the partially halogenated elastomeric gum.

* * * * *